US011210614B1

(12) United States Patent
Hamilton

(10) Patent No.: US 11,210,614 B1
(45) Date of Patent: Dec. 28, 2021

(54) METHOD AND APPARATUS FOR CELL-BASED WORKFORCE SCHEDULING

(71) Applicant: Verint Americas Inc., Alpharetta, GA (US)

(72) Inventor: Edward Hamilton, Mount Hamilton, CA (US)

(73) Assignee: Verint Americas, Inc., Alpharetta, GA (US)

(*) Notice: Subject to any disclaimer, the term of this patent is extended or adjusted under 35 U.S.C. 154(b) by 558 days.

(21) Appl. No.: 13/965,983

(22) Filed: Aug. 13, 2013

Related U.S. Application Data

(63) Continuation of application No. 13/278,519, filed on Oct. 21, 2011, now Pat. No. 8,510,144.

(51) Int. Cl.
*G06Q 10/06* (2012.01)
(52) U.S. Cl.
CPC ........... *G06Q 10/063116* (2013.01); *G06Q 10/06311* (2013.01); *G06Q 10/063112* (2013.01); *G06Q 10/06* (2013.01)
(58) Field of Classification Search
CPC ........... G06Q 10/06; G06Q 10/06311; G06Q 10/063116; G06Q 10/06316; G06Q 10/0631; G06Q 10/06314; G06Q 10/06315; G06Q 10/1097; G06Q 10/063112; G06Q 10/105; G06Q 10/109; G06Q 10/063; G06Q 10/0633; H04L 67/32; G06F 17/30569; G06F 17/30333
(Continued)

(56) References Cited

U.S. PATENT DOCUMENTS 6,334,133 B1 12/2001 Thompson et al.
6,415,259 B1 * 7/2002 Wolfinger ........ G06Q 10/06311
705/7.13

(Continued)

FOREIGN PATENT DOCUMENTS

JP 2006277060 A * 10/2006 ............. G06Q 10/06

OTHER PUBLICATIONS

Mozafar Saadat, A Holonic Shop floor Workforce Allocation System, 2010 5th International Conference on System of Systems Engineering (Year: 2010).*

*Primary Examiner* — Jerry O'Connor
*Assistant Examiner* — Matthew H Divelbiss
(74) *Attorney, Agent, or Firm* — Christopher M. Scherer; DeWitt LLP

(57) ABSTRACT

A method for workforce scheduling by a computer system is provided. The method includes receiving a first workforce schedule describing initial assignments of a plurality of workers to a plurality of shifts, each shift comprising one or more work activities, each work activity comprising an activity and a time interval, and storing the first workforce schedule in a memory. The method also includes receiving a cell size associated with each activity, and determining a quantity of workers in each work activity associated with each activity in the first workforce schedule. The method further includes determining cell size violations by dividing the quantity of workers assigned to each work activity by the cell size for the activity associated with the work activity. The method also includes modifying the first workforce schedule to minimize cell size violations, resulting in a second workforce schedule, and storing the second workforce schedule in the memory.

12 Claims, 11 Drawing Sheets

(58) Field of Classification Search
USPC ....... 705/7.13, 7.14, 7.12, 7.19; 379/221.02; 455/411
See application file for complete search history.

(56) References Cited

U.S. PATENT DOCUMENTS

| | | |
|---|---|---|
| 7,603,285 B2 * | 10/2009 | Jacobs et al. ................ 705/7.14 |
| 8,073,731 B1 | 12/2011 | Rajasenan |
| 2002/0035495 A1 | 3/2002 | Spira et al. |
| 2003/0083912 A1 | 5/2003 | Covington et al. |
| 2004/0098299 A1 | 5/2004 | Ligon et al. |
| 2004/0193473 A1 | 9/2004 | Robertson et al. |
| 2005/0209902 A1 | 9/2005 | Iwasaki et al. |
| 2006/0041458 A1 | 2/2006 | Ringrose et al. |
| 2006/0106833 A1 * | 5/2006 | Chen ................... G06F 16/2264 |
| 2010/0049574 A1 | 2/2010 | Paul et al. |

* cited by examiner

| <date>  | 09:00 | 10:00 | 11:00 | 12:00 | 13:00 | 14:00 |
|---------|-------|-------|-------|-------|-------|-------|
| cell_1  | 4 - 1 | 4 - 4 | 4 - 4 | 3 - 3 | 2 - 2 | 2 - 2 |
| cell_2  | 3 - 3 | 3 - 3 | 3 - 1 | 2 - 3 | 2 - 2 | 2 - 2 |
| cell_3  | 4 - 4 | 4 - 4 | 4 - 4 | 4 - 4 | 4 - 4 | 4 - 4 |
| cell_4  | 3 - 3 | 3 - 3 | 3 - 3 | 3 - 3 | 3 - 3 | 3 - 3 |
| cell_5  | 2 - 2 | 2 - 2 | 2 - 2 | 2 - 2 | 2 - 2 | 2 - 2 |
| cell_6  | 2 - 1 | 2 - 2 | 3 - 3 | 4 - 4 | 4 - 4 | 4 - 4 |
| cell_7  | 2 - 2 |       |       |       |       |       |
| cell_8  |       |       |       |       |       |       |
| cell_9  |       |       |       |       |       |       |
| cell_10 |       |       |       |       |       |       |

Figure 3

| <date>  | 09:00 | 10:00 | 11:00 | 12:00 | 13:00 | 14:00 |
|---------|-------|-------|-------|-------|-------|-------|
| cell_1  |       | 4 - 4 | 4 - 4 | 3 - 3 | 2 - 2 | 2 - 2 |
| cell_2  | 3 - 3 | 3 - 3 |       |       | 2 - 2 | 2 - 2 |
| cell_3  | 4 - 4 | 4 - 4 | 4 - 4 | 4 - 4 | 4 - 4 | 4 - 4 |
| cell_4  | 3 - 3 | 3 - 3 | 3 - 3 | 3 - 3 | 3 - 3 | 3 - 3 |
| cell_5  | 2 - 2 | 2 - 2 | 2 - 2 | 2 - 2 | 2 - 2 | 2 - 2 |
| cell_6  |       | 2 - 2 | 3 - 3 | 4 - 4 | 4 - 4 | 4 - 4 |
| cell_7  | 2 - 2 |       |       |       |       |       |
| cell_8  |       |       |       |       |       |       |
| cell_9  |       |       |       |       |       |       |
| cell_10 |       |       |       |       |       |       |

Figure 4

| <date>  | 09:00 | 10:00 | 11:00 | 12:00 | 13:00 | 14:00 |
|---------|-------|-------|-------|-------|-------|-------|
| cell_1  | 4 - 4 | 4 - 4 | 4 - 4 | 3 - 3 | 2 - 2 | 2 - 2 |
| cell_2  | 3 - 3 | 3 - 3 | 3 - 1 | 2 - 2 | 2 - 2 | 2 - 2 |
| cell_3  | 4 - 4 | 4 - 4 | 4 - 4 | 4 - 4 | 4 - 4 | 4 - 4 |
| cell_4  | 3 - 3 | 3 - 3 | 3 - 3 | 3 - 3 | 3 - 3 | 3 - 3 |
| cell_5  | 2 - 2 | 2 - 2 | 2 - 2 | 2 - 2 | 2 - 2 | 2 - 2 |
| cell_6  |       | 2 - 2 | 3 - 3 | 4 - 4 | 4 - 4 | 4 - 4 |
| cell_7  |       |       |       |       |       |       |
| cell_8  |       |       |       |       |       |       |
| cell_9  |       |       |       |       |       |       |
| cell_10 |       |       |       |       |       |       |

Figure 5

| <date>  | 09:00     | 10:00     | 11:00     | 12:00     | 13:00     | 14:00     |
|---------|-----------|-----------|-----------|-----------|-----------|-----------|
| cell_1  | station_1 | station_1 | station_3 | station_3 | station_3 | station_1 |
| cell_2  | station_2 | station_2 | station_2 | station_2 | station_2 | station_2 |
| cell_3  | station_3 | station_3 | station_1 | station_1 | station_4 | station_3 |
| cell_4  | station_4 | station_1 | station_4 | station_4 | station_4 | station_4 |
| cell_5  | station_5 | station_5 | station_5 | station_5 | station_5 | station_5 |
| cell_6  | station_6 | station_6 | station_6 | station_6 | station_6 | station_6 |
| cell_7  | station_7 |           |           |           |           |           |
| cell_8  |           | station_7 |           |           |           |           |
| cell_9  |           |           | station_7 |           |           |           |
| cell_10 |           |           | station_7 |           |           |           |

Figure 6

| <date> | 09:00 | 10:00 | 11:00 | 12:00 | 13:00 | 14:00 |
|---|---|---|---|---|---|---|
| cell_1 | station_1 | station_1 | station_3 | station_3 | station_3 | station_1 |
| cell_2 | station_2 | station_2 | station_2 | station_2 | station_2 | station_2 |
| cell_3 | station_3 | station_3 | station_1 | station_1 | station_4 | station_3 |
| cell_4 | station_4 | station_4 | station_4 | station_4 | station_1 | station_4 |
| cell_5 | station_5 | station_5 | station_5 | station_5 | station_5 | station_5 |
| cell_6 | station_6 | station_6 | station_6 | station_6 | station_6 | station_6 |
| cell_7 | station_7 | | | | | |
| cell_8 | | station_7 | | | | |
| cell_9 | | | station_7 | | | |
| cell_10 | | | | station_7 | | |

Figure 7

Station_1: <date>
    Cell-ops 2 from 09:00 to 10:00, Attendees = cell_1
    Cell-ops 2 from 10:00 to 11:00, Attendees = cell_1
    Cell-ops 2 from 11:00 to 12:00, Attendees = cell_3
    Cell-ops 2 from 12:00 to 13:00, Attendees = cell_3
    Cell-ops 2 from 13:00 to 14:00, Attendees = cell_1
    Cell-ops 2 from 14:00 to 15:00, Attendees = cell_1

Figure 8

METHOD AND APPARATUS FOR CELL-BASED WORKFORCE SCHEDULING

CROSS-REFERENCE TO RELATED APPLICATIONS

This application is continuation of U.S. application Ser. No. 13/278,519, filed Oct. 21, 2011, the contents of which is incorporated herein by reference in its entirety.

TECHNICAL BACKGROUND

In many business environments the optimum staffing of employees is variable and complex. For example, some businesses may see seasonal affects in sales, while in other businesses the need for employees may vary throughout the day. As the number of employees increases, the complexity of scheduling these employees for work also increases.

In some environments, employees may work in teams for all or part of a shift, and these teams must be flexible, yet assigned based on the abilities of the employees. Further scheduling complications arise when groups of employees must use certain equipment to perform their tasks. Typically, the quantity of equipment available is limited and its use must be strictly scheduled.

OVERVIEW

In an embodiment, a method for workforce scheduling by a computer system is provided. The method includes receiving, in a processor, a first workforce schedule describing initial assignments of a plurality of workers to a plurality of shifts, each shift comprising one or more work activities, each work activity comprising an activity and a time interval, and storing the first workforce schedule in a memory.

The method also includes receiving a cell size associated with each activity, and determining a quantity of workers in each work activity associated with each activity in the first workforce schedule. The method further includes determining cell size violations by dividing the quantity of workers assigned to each work activity by the cell size for the activity associated with the work activity.

The method also includes modifying the first workforce schedule to minimize cell size violations, resulting in a second workforce schedule, and storing the second workforce schedule in the memory.

In another embodiment, a method for cell scheduling of a workforce to minimize occurrences of broken cells comprises generating a first workforce schedule having a global score and comprising a plurality of cells, each cell requiring a defined number of workers; identifying at least one target cell of the plurality of cells that is broken such that the target cell fails to have the defined number of workers scheduled identifying a plurality of repair solutions to resolve the target cell such that the target cell will have the defined number of workers scheduled; and selecting one of the plurality of repair solutions with which to modify the first workforce schedule based on an impact of each of the plurality of repair solutions on the global score.

In an embodiment, the first workforce schedule is generated using a local search process that evaluates a plurality of assignments of the workforce to shift events, and wherein the plurality of repair solutions comprises a subset of the plurality of assignments, and wherein the method further comprises running the local search process on the subset of the plurality of assignments to identify the impact of each of the plurality of repair solutions on the global score.

In an embodiment, generating the first workforce schedule includes evaluating a first quantity of assignments of the workforce to shift events, and wherein the plurality of repair solutions comprises a second quantity of the assignments of the workforce to the shift events that is less than the first quantity.

In an embodiment, the second quantity is at least two orders of magnitude less than the first quantity.

In an embodiment, the method includes modifying the first workforce schedule using the one of the repair solutions to generate a revised workforce schedule.

In an embodiment, the method includes evaluating each of the repair solutions to determine the impact of each of the plurality of repair solutions on the global score.

In an embodiment, a first repair solution of the plurality of repair solutions comprises deleting the target cell.

In an embodiment, a second repair solution of the plurality of repair solutions comprises swapping activities within the target cell with activities within at least one other cell of the plurality of cells.

In an embodiment, the first repair solution is selected as the one of the repair solutions if the impact of the first repair solution on the global score is less harmful than the impact of the second repair solution on the global score.

In an embodiment, the second repair solution is selected as the one of the repair solutions if the impact of the second repair solution on the global score is less harmful the impact of the second repair solution on the global score.

In an embodiment, a system for cell-based workforce scheduling is provided. The system includes a memory configured for storing workforce schedules, and a processor coupled to the memory. The processor configured to receive a first workforce schedule describing initial assignments of a plurality of workers to a plurality of shifts, each shift comprising one or more work activities, each work activity comprising an activity and a time interval, and store the first workforce schedule in the memory.

The processor is also configured to receive a cell size associated with each activity, and determine a quantity of workers in each work activity associated with each activity in the first workforce schedule. The processor is further configured to determine cell size violations by dividing the quantity of workers assigned to each work activity by the cell size for the activity associated with the work activity, and to modify the first workforce schedule to minimize cell size violations, resulting in a second workforce schedule. The processor stores the second workforce schedule in the memory.

In a further embodiment, a non-transitory, computer-readable medium having instructions stored thereon for operating a processor within a cell-based workforce scheduling system is provided. The instructions, when executed by the processor, direct the processor to receive a first workforce schedule describing initial assignments of a plurality of workers to a plurality of shifts, each shift comprising one or more work activities, each work activity comprising an activity and a time interval, and store the first workforce schedule in a memory.

The instructions also direct the processor to receive a cell size associated with each activity, and determine a quantity of workers in each work activity associated with each activity in the first workforce schedule. The instructions further direct the processor to determine cell size violations by dividing the quantity of workers assigned to each work activity by the cell size for the activity associated with the work activity.

The instructions also direct the processor to modify the first workforce schedule to minimize cell size violations, resulting in a second workforce schedule, and to store the second workforce schedule in the memory.

BRIEF DESCRIPTION OF THE DRAWINGS

FIG. 3 illustrates an example workforce schedule for use with a cell-based workforce scheduler.

FIG. 4 illustrates an example workforce schedule for use with a cell-based workforce scheduler.

FIG. 5 illustrates an example workforce schedule for use with a cell-based workforce scheduler.

FIG. 6 illustrates an example workforce schedule including station assignments for use with a cell-based workforce scheduler.

FIG. 7 illustrates an example workforce schedule including stations assignments for use with a cell-based workforce scheduler.

FIG. 8 illustrates an example station schedule for use with a cell-based workforce scheduler.

DETAILED DESCRIPTION

Figure 1:
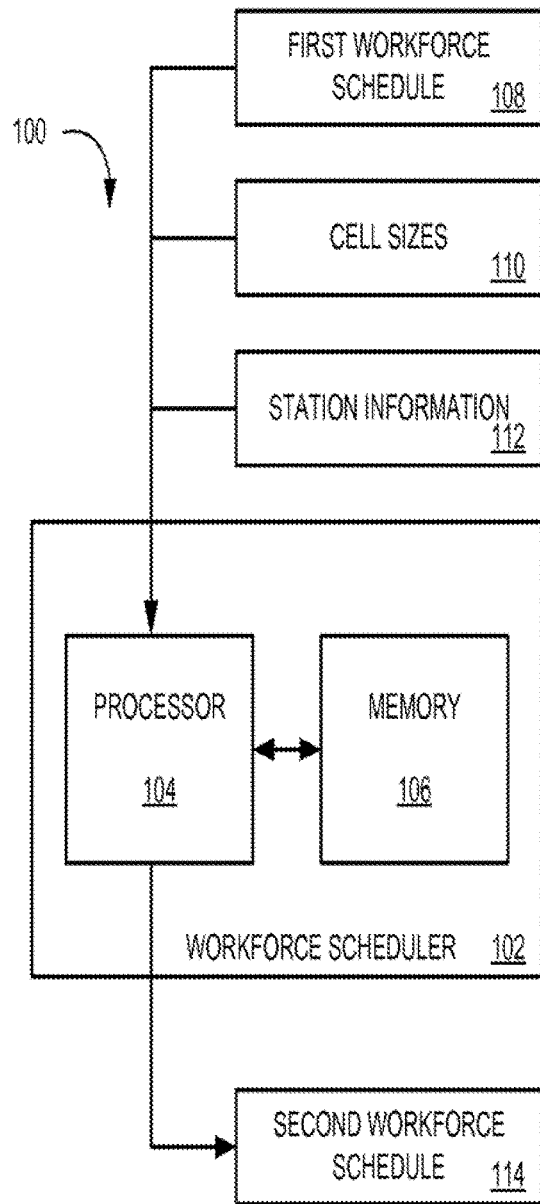
FIG. 1 illustrates a computer system configured for operating as a cell-based workforce scheduler.

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Industry experts have determined that when performing certain tasks: task activity handle times are about the same, task activities are always handled in the same order, and groups of workers are skilled for all of the activities of the task. Thus, grouping task activities into composite activities or "cells" will increase overall efficiency. This efficiency may be obtained by creating cell-based workforce schedules.

In a cell-based workforce, a task will be completed earlier as the task will not have to wait for someone to come available for the next activity, workers in the cell will all have the ability to perform the next task activity. Worker idle time is reduced as workers do not have to wait to start the next task activity, but may begin as soon as they are able.

In a cell-based workforce schedule, a plurality of workers are assigned to a plurality of shifts. Each shift comprises one or more work activity, and each work activity comprises an activity and a time interval. Typically time intervals constitute one hour, but in some embodiments may be longer or shorter. A cell size constraint is included in the cell-based workforce scheduler. This constraint requires that at any moment in time, the number of workers performing any activity must divide evenly into the "cell size" for the activity.

For example, if an activity requires three workers, it has a "cell size" of three, and only multiples of three workers may be assigned to that activity at any given time without creating a cell size violation. Employees are divided into groups of workers, or cells, all working on the same composite activity. These composite activities may vary throughout the shift as required, and since the composite activities vary, the required cell size may vary throughout a shift.

The goal of a cell-based workforce scheduler is to reduce as much as possible the number of cell size variations within a given cell-based workforce schedule. This optimization may be performed using any of a wide variety of methods. For example, work activities may be shuffled in time during the day to try and minimize cell size violations. Workers may be assigned to different activities to fill out partial cells. Work activities having partially filled cells may be combined to constitute a completely filled cell.

In some work environments, one or more work stations may be provided for various work activities. Typically, these stations are configured to support use by a limited number of workers. If too many workers are assigned to a station at any given time, excess workers will be idle since the other workers will be filling all the possible positions at the work station. This fact further complicates workforce scheduling.

For example, a work activity may require the use of one of two available work stations. If three cells are assigned to the work activity at the same time, the stations are overloaded since two stations are available for use by three cells of workers. In some embodiments, cell-based workforce schedulers are configured to optimize use of work stations and to prevent double-booking any work station.

FIG. 1 illustrates a computer system 100 configured for operating as a cell-based workforce scheduler 102. In this example embodiment, cell-based workforce scheduler 102 includes processor 104 and memory 106. Workforce scheduler 102 receives first workforce schedule 108, a cell size 110 associated with each activity in first workforce schedule 108, and optionally station information 112 related to first work force schedule 108.

These inputs may be stored by workforce scheduler 102 in memory 106. Processor 104 operates on first workforce schedule 108 and cell sizes 110 to produce an optimized cell-based second workforce schedule 114. Second workforce schedule 114 has been produced by workforce scheduler 102 in such a manner as to completely fill all work cells as completely as possible. Methods for optimizing cell-based workforce schedules are described in detail below.

Figure 2:
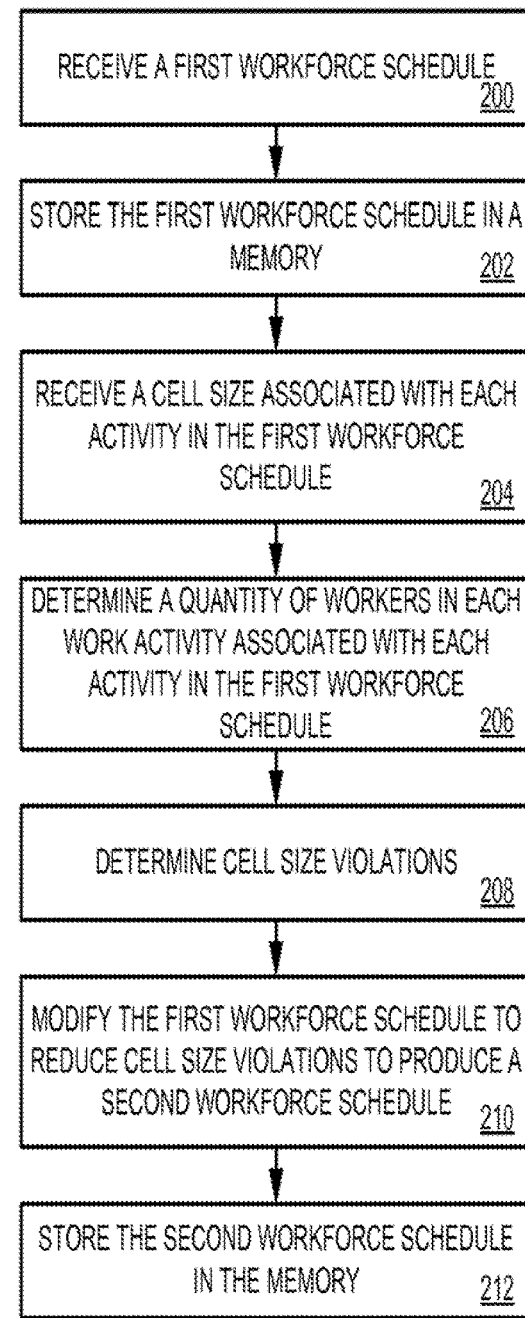
FIG. 2 illustrates a flow chart of a method of operating a cell-based workforce scheduler.

FIG. 2 illustrates a flow chart of a method of operating a cell-based workforce scheduler. In this example embodiment, a cell-based workforce scheduler 102 receives a first workforce schedule 108, (operation 200). First workforce schedule 108 may be received through a communication interface, an input device, a non-transitory memory device, or the like.

Cell-based workforce scheduler 102 stores first workforce schedule 108 in memory 106, (operation 202). Cell-based workforce scheduler 102 receives a cell size 110 associated with each activity in first workforce schedule 108, (operation 204). Cell sizes may be received through a communication interface, an input device, a non-transitory memory device, or the like.

Cell-based workforce scheduler 102 determines a quantity of workers in each work activity associated with each activity in first workforce schedule 108, (operation 206). This determination may be obtained simply by parsing first workforce schedule 108 and adding up how many workers are assigned to each work activity associated with each activity in first workforce schedule 108.

Cell-based workforce scheduler 102 determines if any cell size violations exist, (operation 208). For example, if nine workers are assigned to a work activity having a cell size of four, there is a cell size violation of one worker since one worker is left over when two teams of four are created.

Cell-based workforce scheduler 102 modifies first workforce schedule 108 to reduce cell size violations and produce second workforce schedule 114, (operation 210). This modification of first workforce schedule 108 may be performed using any of a wide variety of methods. For example, work activities may be shuffled in time during the day to try and minimize cell size violations. Workers may be assigned to different activities to fill out partial cells. Work activities having partially filled cells may be combined to constitute a completely filled cell.

Second workforce schedule 114 is stored in memory 106, (operation 212). Second workforce schedule may also be provided to a user through a display, communication interface, or other output device. The format of second workforce schedule 114 may vary greatly according to the requirements of users of cell-based workforce scheduler 102.

FIG. 3 illustrates an example workforce schedule for use with a cell-based workforce scheduler. In this example embodiment, a very simple first workforce schedule is shown. This example schedule includes workforce assignments for 10 cells over one six hour shift. Each of these cells represents one or more workers who perform their jobs together. Each work activity may require a different number of workers at different times to perform an activity associated with each cell at each time. Each block of this schedule represents a work activity which has a cell size requirement and a number of workers currently assigned to the work activity.

This example schedule illustrates a six hour shift starting at 09:00 and ending at 15:00. Each block in the schedule represents one work activity occurring for one hour. Each block contains data of the format (X-Y) where X is the cell size, or the number of workers required to fill a cell for this particular work activity at this particular time, and Y is the number of workers currently assigned to this work activity. Blocks which are cross hatched are not currently assigned to any workers.

In this example, cell_1, representing one or more workers, starts at 09:00 with a work activity requiring four workers, but only one worker is assigned. This is a cell size violation. At 10:00 and 11:00, cell_1 is assigned work activities requiring four workers, with four assigned. These are complete cells since they contain the required number of workers. Cell_1 also has complete cells assigned at 12:00, 13:00, and 14:00 hours, these cells requiring three, two, and two workers respectively.

Cell_2 also represents one or more workers, and has a cell size violation at 11:00 when one worker is assigned to a work activity with a cell size of three. Cell_2 also has a cell size violation at 12:00 where three workers are assigned to a work activity with a cell size of two. Cell_3 has been assigned only work activities requiring four workers, and has four workers assigned to each work activity. Thus, it has no cell size violations and only includes complete cells. Likewise, cell_4 and cell_5 have no cell size violations.

Cell_6 has a cell size violation at 09:00 where one worker is assigned to a work activity having a cell size of two. Cell_7 has only been assigned one work activity for the day requiring two workers.

FIG. 4 illustrates an example workforce schedule for use with a cell-based workforce scheduler. This example workforce schedule shows the workforce schedule of FIG. 3 when all of the work activities having cell size violations have been removed from the workforce schedule, leaving holes in the workforce schedule.

Note that the work activity for cell_1 at 09:00 has been removed, along with the work activities for cell_2 at 11:00 and 12:00, and cell 6 at 09:00. This allows the cell-based workforce scheduler to re-assign these workforce activities in such a manner as to have complete cells.

FIG. 5 illustrates an example workforce schedule for use with a cell-based workforce scheduler. This example workforce schedule shows the results of a cell-based workforce scheduler combining work activities to remove cell size violations from the workforce schedule of FIG. 4.

In this example, the work activities for cell_1, cell_6, and cell_7 at 09:00 have been combined into a work activity for cell_1 at 09:00 with a cell size of four, and with four workers assigned to the activity. The work activities for cell_6 and cell_7 at 09:00 have been canceled.

The work activity for cell_2 at 11:00 has re-appeared, and still has a cell size violation, however the work activity for cell_2 at 12:00 has not re-appeared. In this example, the cell-based workforce scheduler was unable to fill in the required three workers for this particular work activity. While this example illustrates a case where an incomplete cell is allowed to stay in the workforce schedule, other embodiments may be configured to delete all cell size violations from the workforce schedule.

In this example embodiment, understaffing cell size violations are weighed less than overstaffing cell size violations. Thus, some understaffing violations, such as cell_2 at 11:00 are allowed, while the overstaffing violation of cell_2 at 12:00 is not allowed. Other embodiments may weigh overstaffing violations less than understaffing violations, and such an embodiment would allow the overstaffing violation of cell_2 at 12:00, but not the understaffing violation of cell_2 at 11:00.

FIG. 6 illustrates an example workforce schedule including station assignments for use with a cell-based workforce scheduler. In this example, a first workforce schedule has been provided that includes station assignments for each work activity. This example workforce schedule has a six hour shift broken down into six one hour time intervals. Ten different cells of employees are assigned to work activities requiring the use of seven different work stations.

In this example, cell_1 is assigned to station_1 at 09:00, 10:00, and 14:00. Cell_1 is assigned to station_3 at 11:00, 12:00, and 13:00. Other cells are assigned to stations in a similar manner. Note that at 10:00 both cell_1 and cell_4 are assigned to station_1. This is a station violation since it is assumed in this example that each station is configured for operation by only one cell of workers at a time. At 11:00 station_7 is assigned to both cell_9 and cell_10, and at 13:00 station 4 is assigned to both cell_3 and cell_4.

FIG. 7 illustrates an example workforce schedule including stations assignments for use with a cell-based workforce scheduler. In this example, a cell-based workforce scheduler has processed the first workforce schedule from FIG. 6 to remove station violations and has produced the second workforce schedule shown in FIG. 7.

In this example, the cell-based workforce scheduler has swapped a number of work activities to remove station violations. Cell_4 has had its 10:00 work activity swapped with its 13:00 work activity to remove a station violation at station_1. Also cell_10 has had its 11:00 work activity shifted to 12:00 to remove a station violation at station_7.

FIG. 8 illustrates an example station schedule for use with a cell-based workforce scheduler. Workforce schedules may be provided to a user in a wide variety of formats. For example, graphical displays such as those illustrated in FIGS. 3-7 may be used to communicate workforce schedules to a user. Similarly, textual workforce schedules such as shown in FIG. 8 may be provided to a user.

In this example embodiment, a workforce schedule for station_1 on a particular <date> is illustrated. Here station_1 is assigned to activity cell-ops 2 for the entire shift. However, cell_1 is assigned to station_1 at 09:00, 10:00, 13:00, and 14:00, while cell_3 is assigned to station_1 at 11:00 and 12:00. (This corresponds to the schedule of station_1 illustrated in FIG. 7.)

Figure 9:
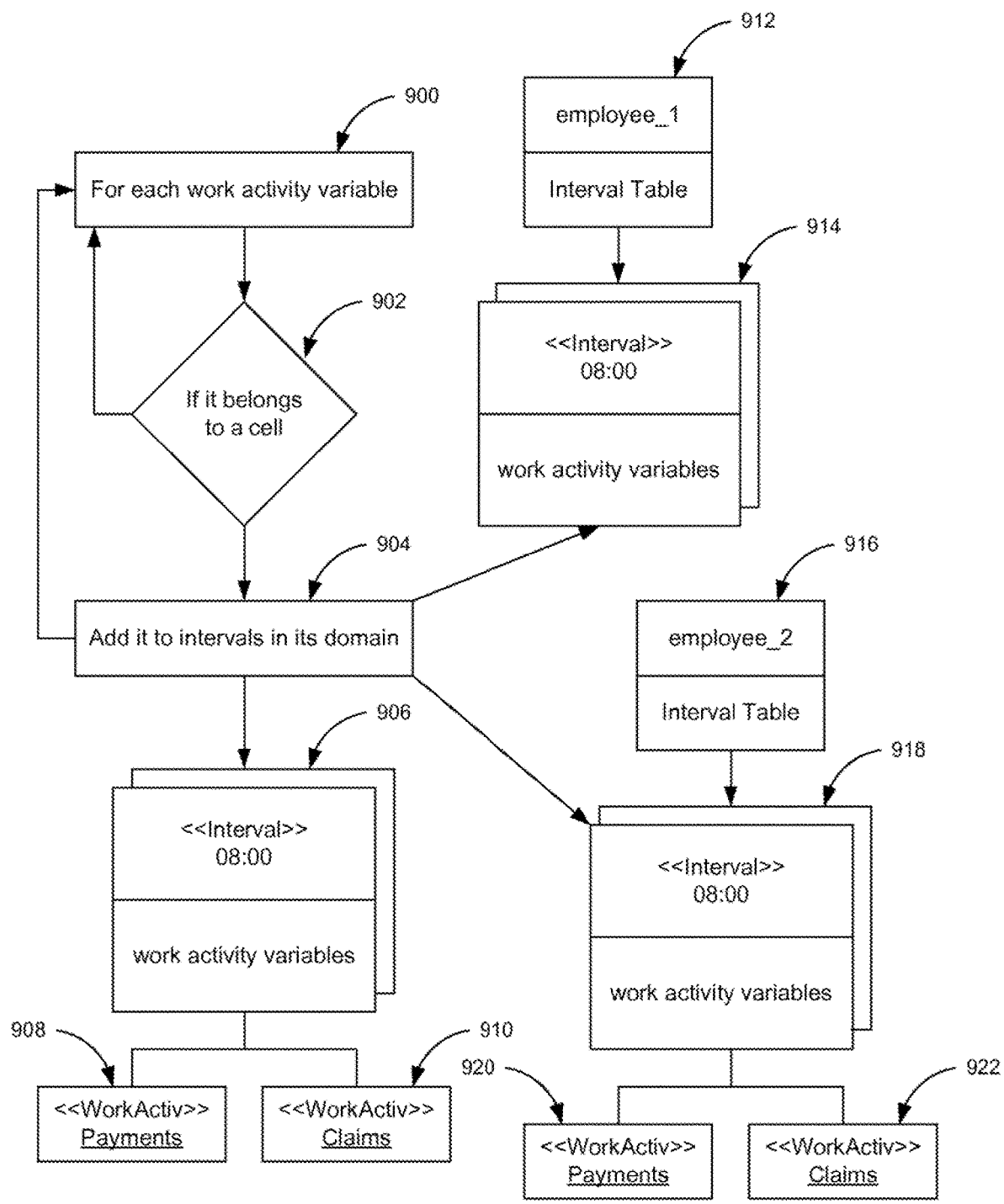
FIG. 9 illustrates a flow chart and data structure of a method of operating a cell-based workforce scheduler.

FIG. 9 illustrates a flow chart and data structure of a method of operating a cell-based workforce scheduler. In this example embodiment, a method of assigning work activities to a plurality of employees is illustrated. This example illustrates an exemplary embodiment of data structures within a cell-based workforce scheduler. Other embodiments may use differing data structures to perform the methods of workforce scheduling described herein.

Each work activity variable is examined, (operation 900). If the work activity variable belongs to a cell (i.e., has been assigned to a worker), (operation 902), it is added to intervals in its domain, (operation 904).

For example, employee_1 912 is associated with an interval table 914. Interval table 914 includes a plurality of time intervals, each having one or more work activity variables, and the first one is illustrated here as the 08:00 interval. In this example, employee_1 has not been assigned any work activities.

Employee_2 916 is associated with interval table 918 including a plurality of time intervals, each having one or more work activity variables. In this example, employee_2 916 at time interval 08:00 has associated with it work activities "payments" 920 and "claims" 922. A third interval table 906 is shown with work activities "payments" 908 and "claims" 910. In some embodiments this structure may represent an interval table that has not yet been associated with a particular employee.

Figure 10:
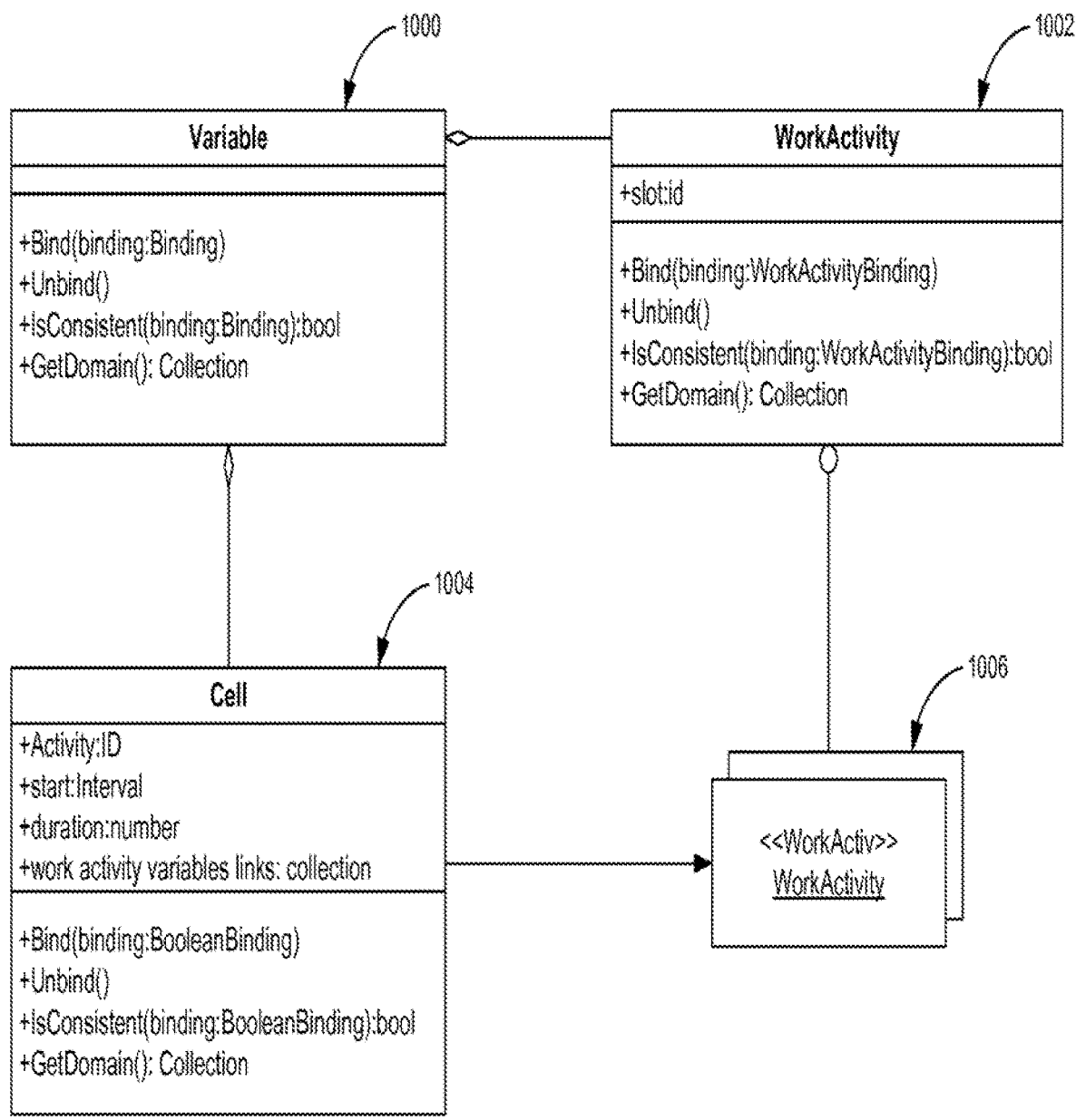
FIG. 10 illustrates a class diagram for cell-based workforce scheduling software.

FIG. 10 illustrates a class diagram for cell-based workforce scheduling software. This example class diagram illustrates the relationship between various software objects in an embodiment of a cell-based workforce scheduler. Other embodiments may use different software objects having different relationships in performing the methods described herein.

In this example embodiment of a cell-based workforce scheduling system, three software objects are associated with work activities 1006. This example system includes a class named "Variable" 1000. "Variable" includes four operations: Bind, Unbind, IsConsistent, and GetDomain.

The system also includes a class named "Cell" 1004 which is associated with class "Variable" 1000, and work activities 1006. "Cell" 1004 includes four attributes: Activity:ID, start:Interval, duration:number, and work activity variables links:collection. "Cell" 1004 also includes four operations: Bind, Unbind, IsConsistent, and GetDomain.

The system further includes a class named "WorkActivity" 1002 which is associated with class "Variable" 1000, and work activities 1006. "WorkActivity" 1002 includes one attribute: slot:id, along with four operations: Bind, Unbind, IsConsistent, and GetDomain.

Figure 11A:
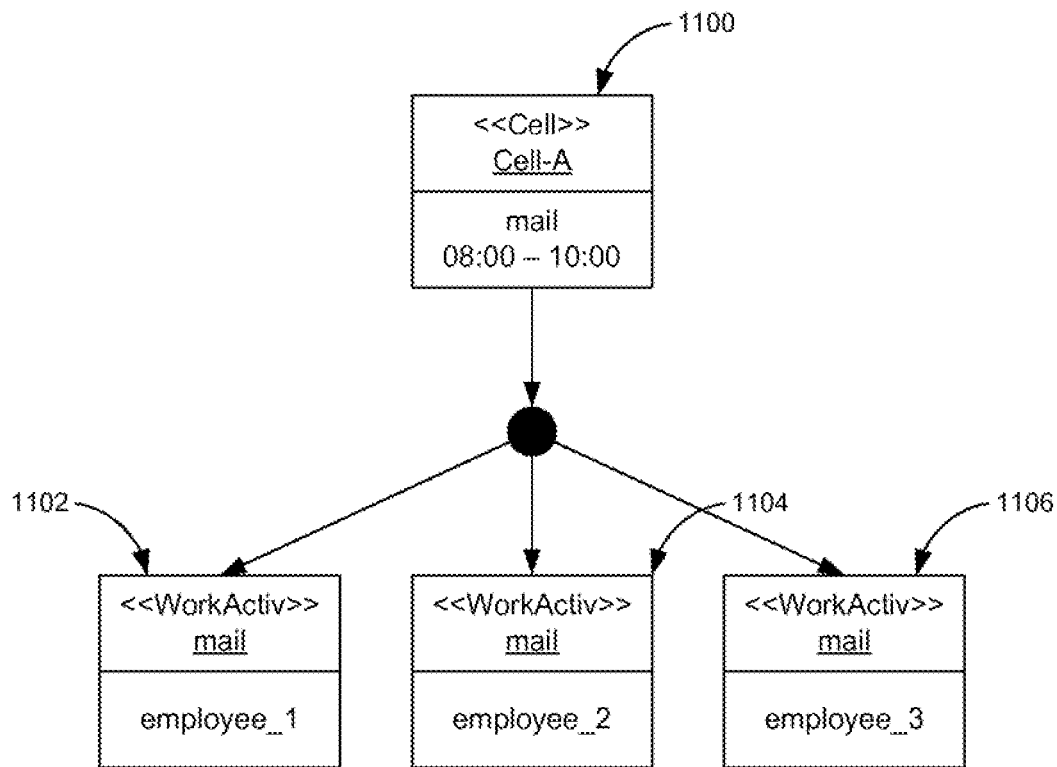
FIGS. 11A and 11B illustrate example event bindings within a cell-based workforce scheduler.
Figure 11B:
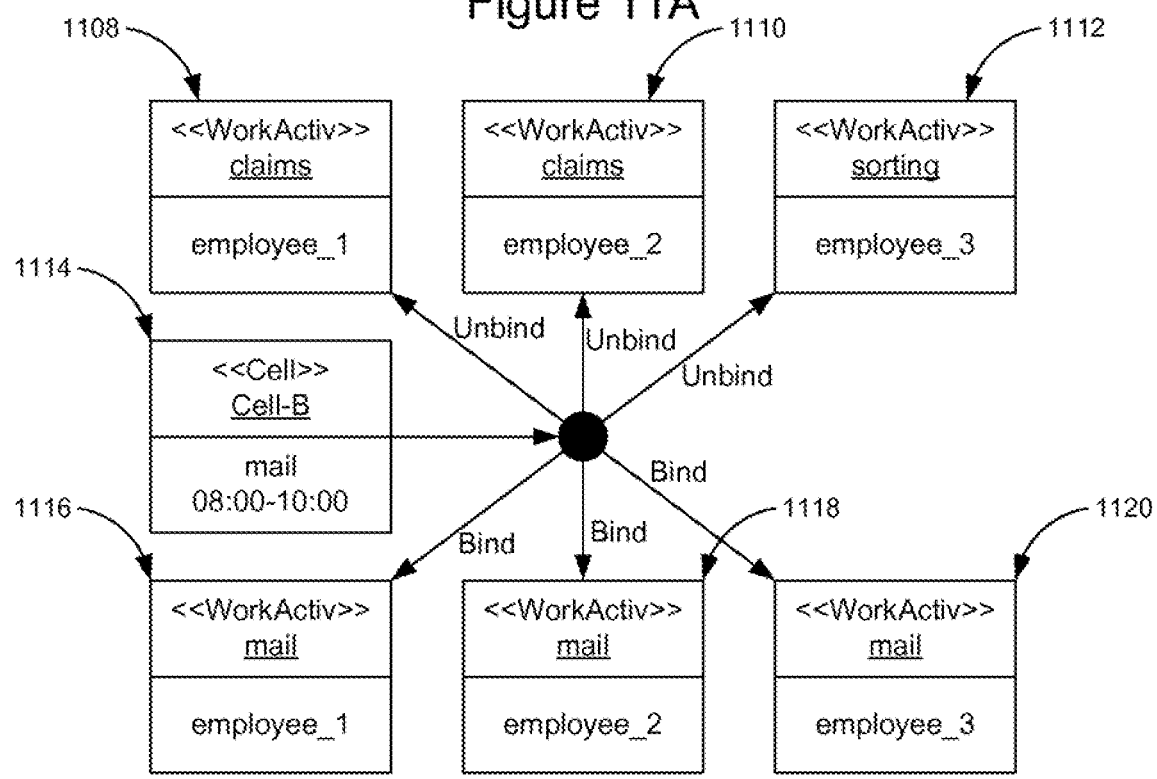

FIGS. 11A and 11B illustrate example event bindings within a cell-based workforce scheduler. FIG. 11A illustrates an example embodiment of a cell-based workforce scheduler where three employees are being assigned to process mail from 08:00 to 10:00. In this example data structure Cell-A 1100 represents the work activity "mail" and includes the interval between 08:00 through 10:00.

In this example, employee_1 is associated with a work activity of "mail" 1102, employee_2 is associated with a work activity of "mail" 1104, and employee_3 is associated with a work activity of "mail". These bindings take place within the exemplary data structure illustrated in FIG. 11A. However, other embodiments may use other data structures to perform these associations.

FIG. 11B illustrates the same binding as FIG. 11A, however, in this example the three employees has already been assigned to process claims or to sort for the interval. Thus, the employee's data structures must first be unbound from their previous assignments before they may be bound to their new assignments.

In this example, employee_1 is unbound from work activity "claims" 1108, and bound to work activity "mail" 1116. Employee_2 is unbound from work activity "claims" 1110, and bound to work activity "mail" 1118. Employee_3 is unbound from work activity "sorting" 1112, and bound to work activity "mail" 1120. In this way, Cell-B 1114 representing the work activity "mail" is staffed with three employees who had previously been assigned to other work activities.

Figure 12:
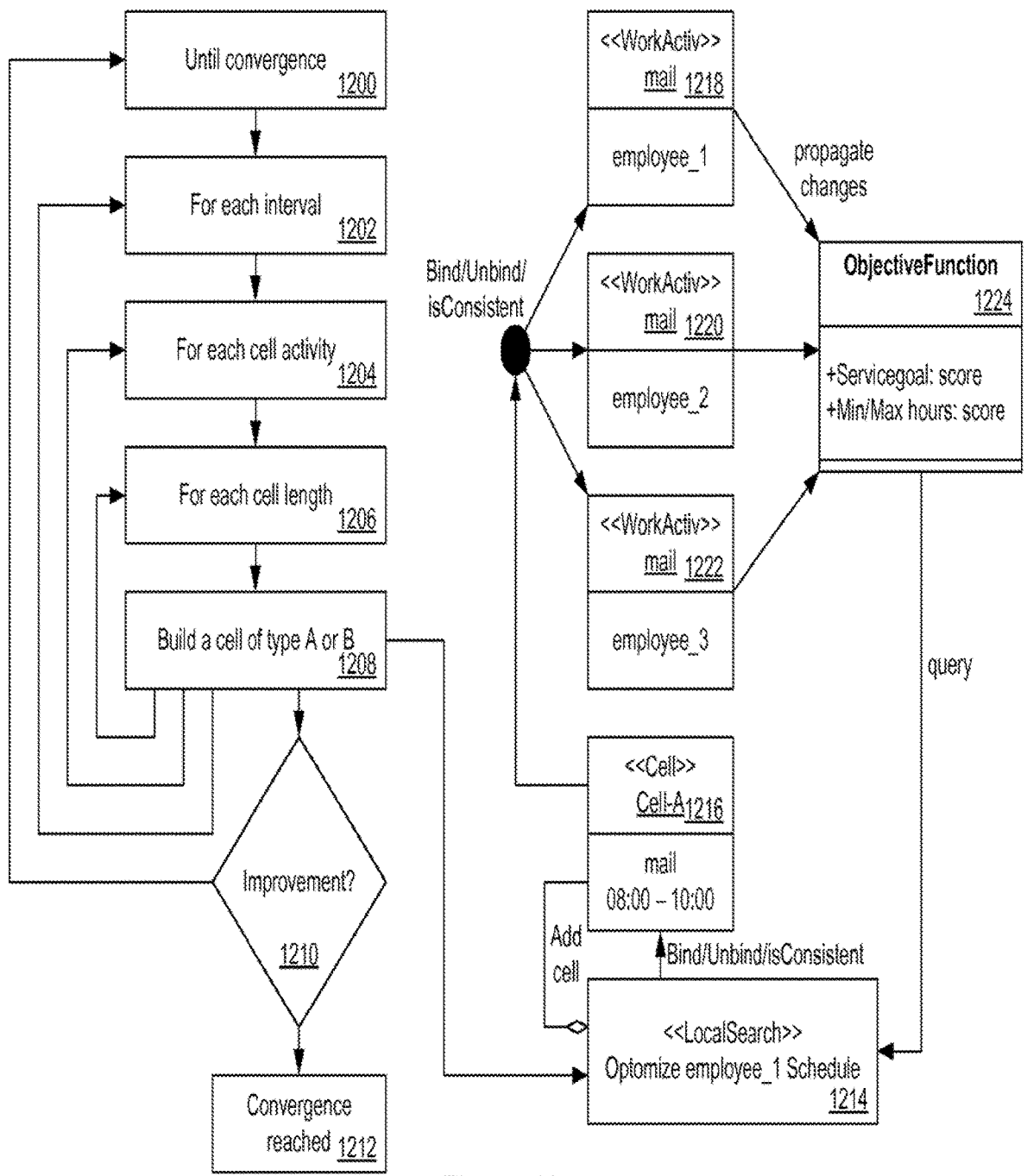
FIG. 12 illustrates a flow chart and data structure of a method of operating a cell-based workforce scheduler.

FIG. 12 illustrates a flow chart and data structure of a method of operating a cell-based workforce scheduler. In this example embodiment, until convergence is reached (operation 1200), for each interval (operation 1202), for each cell activity (operation 1204), for each cell length (operation 1206), a cell of type A or type B is built (operation 1208). Type A cells are complete cells, comprising work activity variables of the same activity as the cell, and can represent a cell to add (i.e. a complete hole to fill) or a cell to remove. Type B cells represent incomplete holes. To fill this hole, a smaller cell is removed to make room for this cell.

An ObjectiveFunction 1224 software object is utilized to determine if any improvement is obtained (operation 1210). If there is no improvement, convergence has been reached (operation 1212), otherwise control returns to operation 1200.

In this example, LocalSearch 1214 is performed to optimize the schedule of employee_1. Cell-A 1216 representing a work activity of "mail" from 08:00 to 10:00 is added, and work activities of "mail" for employee_1 1218, employee_2 1220, and employee_3 1222, are bound, unbound, or checked for consistency as necessary. These changes are propagated to ObjectiveFunction 1224 where the service goal and min/max hours for the employees are scored.

Figure 13:
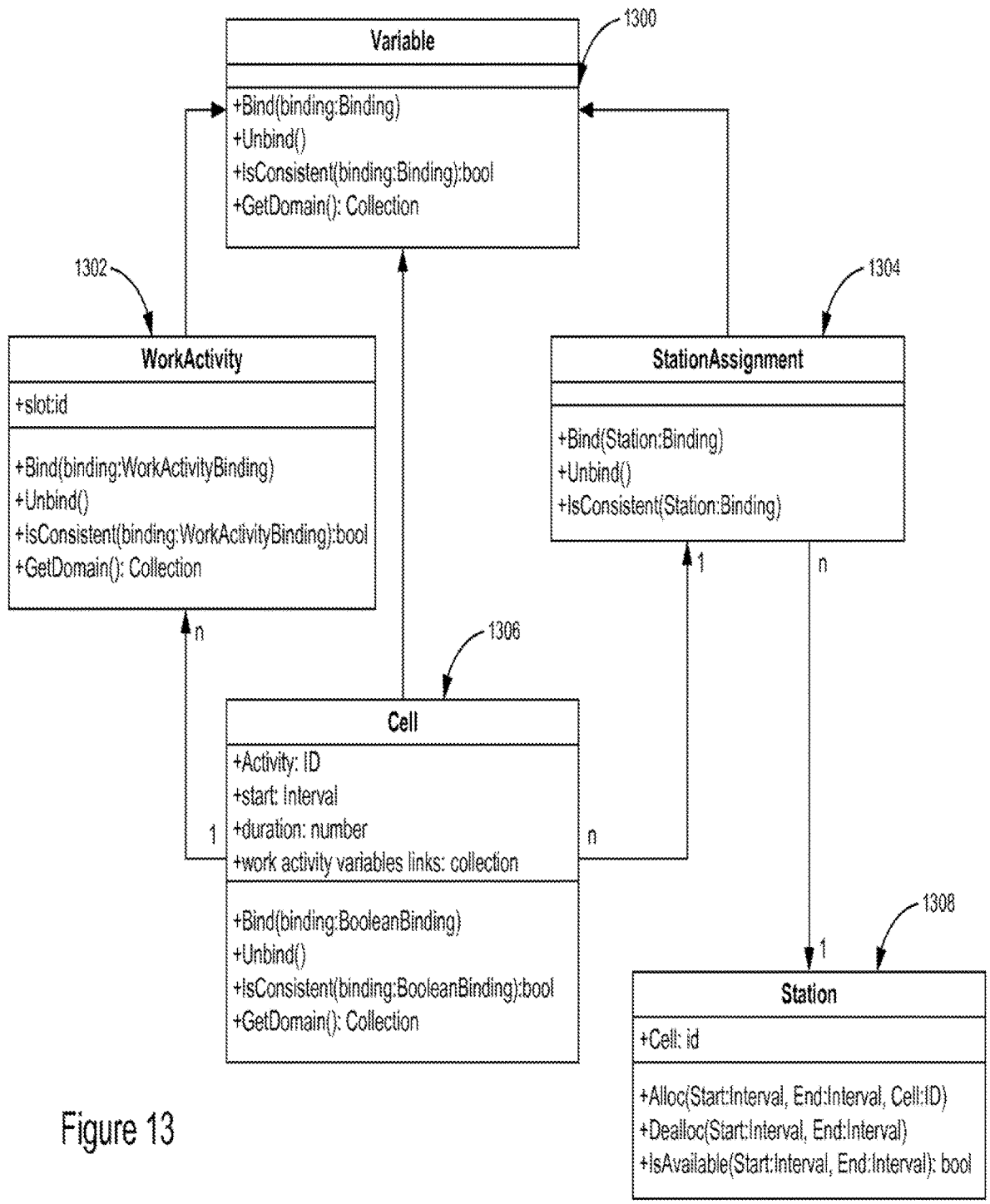
FIG. 13 illustrates a class diagram for cell-based workforce scheduling software including station assignments.

FIG. 13 illustrates a class diagram for cell-based workforce scheduling software including station assignments. This example class diagram illustrates the relationship between various software objects in an embodiment of a cell-based workforce scheduler. Other embodiments may use different software objects having different relationships in performing the methods described herein.

In this example embodiment, five software objects are associated in a system for cell-based workforce scheduling including station assignments. This example system includes a class named "Variable" 1300 having four operations: Bind, Unbind, IsConsistent, and GetDomain.

This example system also includes a class named "WorkActivity" 1302 associated with class "Variable" 1300. Class "WorkActivity" 1302 includes one attribute of slot:id and four operations: Bind, Unbind, IsConsistent, and GetDomain." This system further includes a class named "Cell" 1306 associated with class "Variable" 1300 and class "WorkActivity" 1302. Class "Cell" 1306 includes four attributes: Activity:ID, start:Interval, duration:number, and work activity variables links: collection. Class "Cell" 1306 also includes four operations: Bind, Unbind, IsConsistent, and GetDomain.

This system also includes a class named "StationAssignment" 1304 having three operations: Bind, Unbind, and IsConsistent. The system further includes a class named "Station" 1308 having one attribute of Cell:id, and three operations: Alloc, Dealloc, and IsAvailable.

Figure 14:
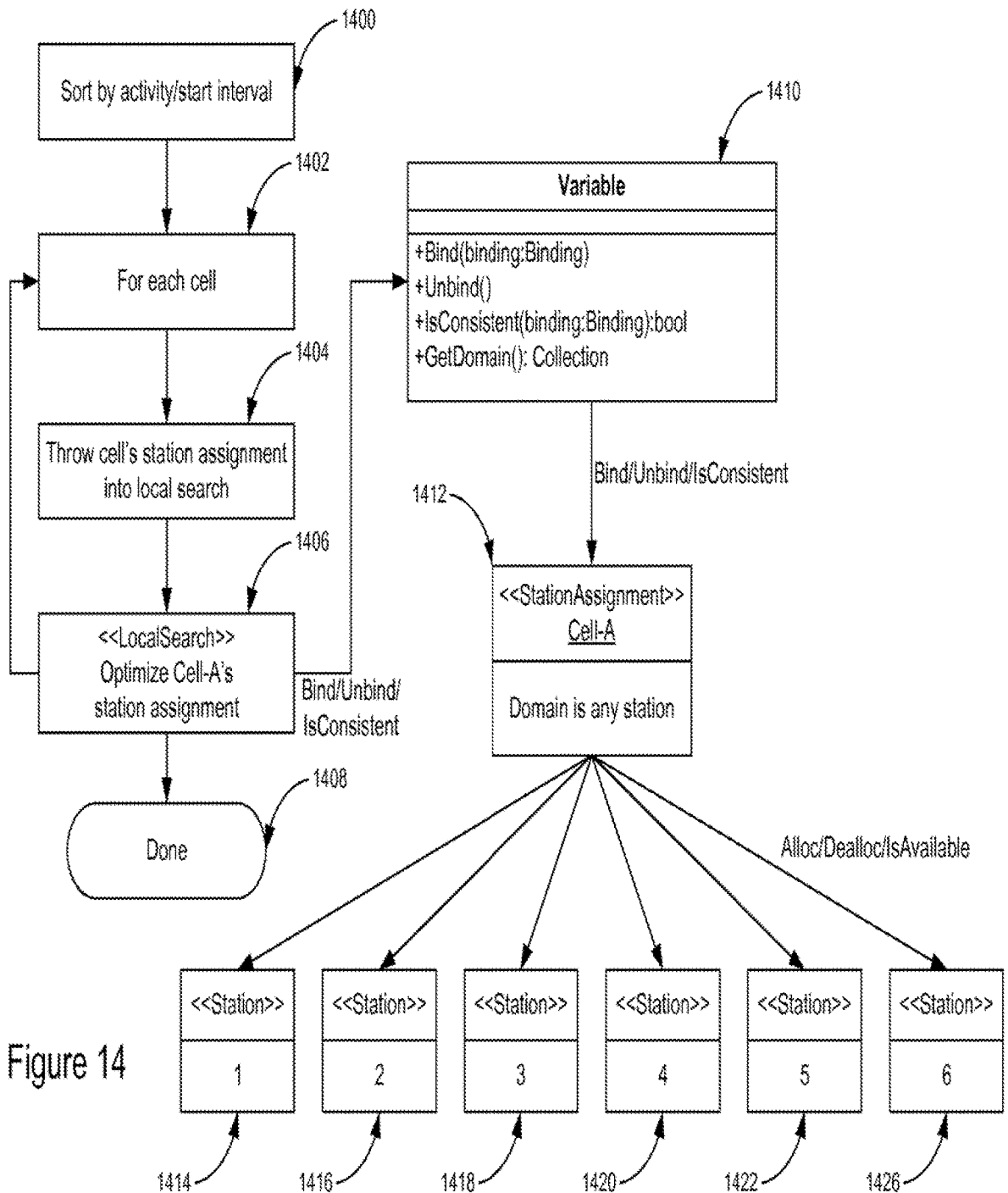
FIG. 14 illustrates a flow chart and data structure for a method of cell-based workforce scheduling including station assignments.

FIG. 14 illustrates a flow chart and data structure for a method of cell-based workforce scheduling including station assignments. In this example embodiment of a cell-based workforce scheduler including station assignments, a first workforce schedule is sorted by activity and start interval (operation 1400). For each cell (operation 1402) the cell's station assignment is thrown into a local search (operation 1404). LocalSearch (operation 1406) optimizes the current cell's (Cell-A) station assignment. When the station assignment is optimized the method is done (operation 1408).

The cell's station assignment is optimized through LocalSearch 1406 which is associated with the class "Variable" 1410. The class "Variable" 1410 includes four operations: Bind, Unbind, IsConsistent, and GetDomain. The class "Variable" 1410 is associated with the StationAssignment 1412 for the current cell (Cell-A) where the domain is any station.

In this example embodiment, six stations 1414-1426 are available for Cell-A to be assigned to through the operations of Alloc, Dealloc, and IsAvailable from StationAssignment 1412.

Figure 15:
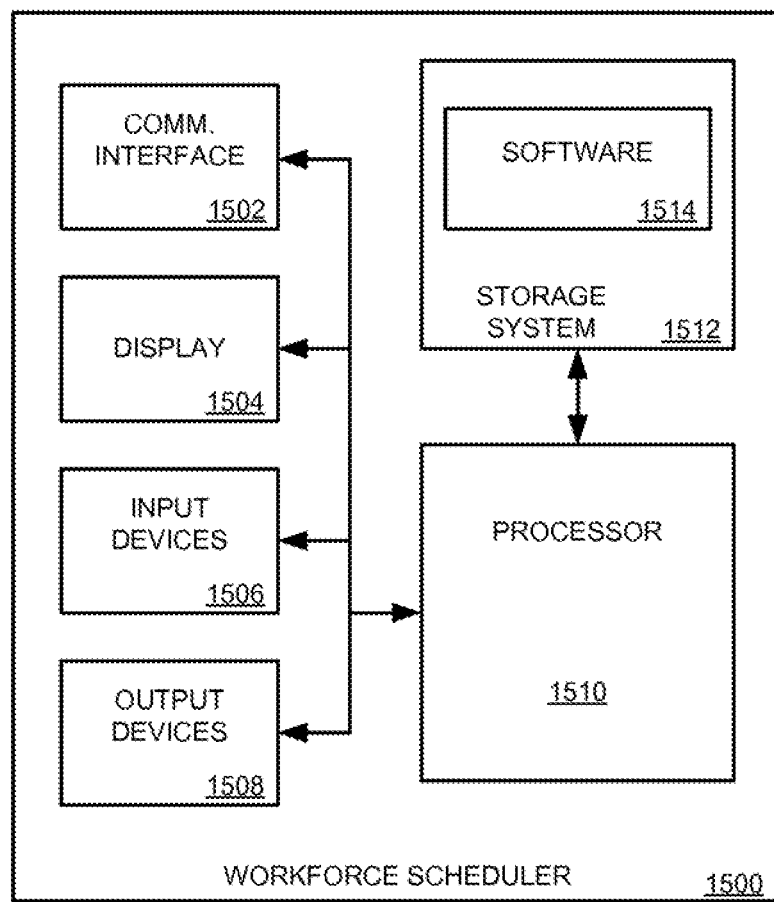
FIG. 15 illustrates a block diagram of a computer system configured to operate as a cell-based workforce scheduler.

FIG. 15 illustrates a block diagram of a computer system configured to operate as a cell-based workforce scheduler 1500. The cell-based workforce scheduler is implemented on workforce scheduler 1500, as shown in FIG. 15. Workforce scheduler 1500 includes communication interface 1502, display 1504, input devices 1506, output devices 1508, processor 1510, and storage system 1512. Processor 1510 is linked to communication interface 1502, display 1504, input devices 1506, output devices 1508, and storage system 1512. Storage system 1512 includes a non-transitory memory device that stores operating software 1514.

Communication interface 1502 includes components that communicate over communication links, such as network cards, ports, RF transceivers, processing circuitry and software, or some other communication devices. Communication interface 1502 may be configured to communicate over metallic, wireless, or optical links. Communication interface 1502 may be configured to use TDM, IP, Ethernet, optical networking, wireless protocols, communication signaling, or some other communication format—including combinations thereof.

Display 1502 may be any type of display capable of presenting information to a user. Displays may include touch screens in some embodiments. Input devices 1506 include any device capable of capturing user inputs and transferring them to workforce scheduler 1500. Input devices 1506 may include a keyboard, mouse, touch pad, or some other user input apparatus. Output devices 1508 include any device capable of transferring outputs from workforce scheduler 1500 to a user. Output devices 1508 may include printers, projectors, displays, or some other user output apparatus. Display 1504, input devices 1506, and output devices 1508 may be external to workforce scheduler 1500 or omitted in some examples.

Processor 1510 includes a microprocessor and other circuitry that retrieves and executes operating software 1514 from storage system 1512. Storage system 1512 includes a disk drive, flash drive, data storage circuitry, or some other non-transitory memory apparatus. Operating software 1514 includes computer programs, firmware, or some other form of machine-readable processing instructions. Operating software 1514 may include an operating system, utilities, drivers, network interfaces, applications, or some other type of software. When executed by processing circuitry, operating software 1514 directs processor 1510 to operate workforce scheduler 1500 as described herein for a cell-based workforce scheduler.

In this example, workforce scheduler 1500 executes a number of methods stored as software 1514 within storage system 1512. The results of these workforce scheduling methods are displayed to a user via display 1504, or output devices 1508. Input devices 1506 allows users to input a variety of data required by the workforce scheduling system.

For example, processor 1510 receives a first workforce schedule, cell sizes, and station information either from communication interface 1502, input devices 1506, or storage system 1512. Processor 1510 then operates on the first workforce schedule, cell sizes, and station information to produce a cell-based optimized second workforce schedule which may be stored in storage system 1512, displayed on display 1504, or output through output devices 1508.

It should be understood that it would be possible to not actually remove station violations. Rather, some implementations could begin with a cell not having any station assignments and a finite number of stations. Then each cell must be assigned a station in a way that does not violate the hard constraints that 1) no two cells may occupy a station at the same time and 2) a station may contain only one cell type (i.e. activity) during a scheduling period. As a result of combinatorial search, either every cell will be assigned a station or we may run out of stations (which can be considered a conflict).

The following briefly describes one implementation of a system for cell-based workforce scheduling. The system comprises a memory configured for storing workforce schedules. The system also comprises a processor coupled to the memory, the processor configured to receive a first workforce schedule describing initial assignments of a plurality of workers to a plurality of shifts, each shift comprising one or more work activities, each work activity comprising an activity and a time interval, store the first workforce schedule in the memory, receive a cell size associated with each activity, determine a quantity of workers in each work activity associated with each activity in the first workforce schedule, determine cell size violations by dividing the quantity of workers assigned to each work activity by the cell size for the activity associated with the work activity, modify the first workforce schedule to minimize cell size violations, resulting in a second workforce schedule, and store the second workforce schedule in the memory.

The processor may be further configured to modify the first workforce schedule to minimize cell size violations by selecting a shift within the first workforce schedule, swapping a pair of work activities within the shift, and determining if the swap reduced the number of cell size violations in the first workforce schedule.

The processor may further configured to assign two or more employees to a cell, where each cell is associated with the two or more employees, an activity, and the time interval of the cell.

The processor may be further configured to modify the first workforce schedule to minimize cell size violations by removing any incomplete cells from the first workforce schedule for each time interval within the first workforce schedule, processing the results of the cell removal to identify any holes in the first workforce schedule, processing the holes in the first workforce schedule to determine if any holes exist that may be filled by a cell, and filling the hole in the schedule by a work activity performed by the cell.

The processor may be further configured to receive a "Prefer Overstaffing" command, and modify the first workforce schedule to minimize cell size violations, but weighing overstaffing violations less than understaffing violations, resulting in a second workforce schedule.

The processor may be further configured to receive a "Prefer Understaffing" command, and modify the first workforce schedule to minimize cell size violations, but weighing understaffing violations less than overstaffing violations, resulting in a second workforce schedule.

The processor may be further configured to receive station assignment information representing physical locations where groups of employees work, determine station assignment violations by processing the first workforce schedule and the station assignment information to find any times where more than one cell is assigned to a single station or more than one cell type is assigned to a single station, and in the processor, modify the first workforce schedule to minimize cell size violations and station assignment violations, resulting in a second workforce schedule.

Advantageously, the system, methods, and software discussed above provide for a single bind/unbind operation during local search results in a reassigning of a plurality of variables (in this case work activity assignments). In prior system a binding during search resulted in the reassignment of a single variable (normally a shift assignment or work activity assignment)—which could be considered a simple repair. The concepts introduced herein consider the notion of search over more complex repairs involving multiple variables (in this case multiple work activity assignments). The granularity of a binding discussed herein is multiple variables, or a complex repair, in contrast with a single variable binding or a simple repair. Previously, the result of local search, particularly when the local search space was a multitude of variables, could be view as a complex repair. However, by making each binding (i.e. each element of search) a more complex repair in itself, the amount of search necessary is greatly reduced.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of optimized workstation allocation to minimize cell size violations, the method comprising:
   determining a first workstation allocation by a processor that receives from a computerized memory a plurality of cells defining initial assignments of a plurality of workstations to a plurality of time periods, each time period comprising one or more work activity, each work activity comprising an activity to execute and a time interval, and storing the first workstation allocation in a memory;
   coupling each workstation and a respective activity to a respective data structure, wherein each workstation and each activity is separately re-assignable by being bound and unbound to another data structure independent of the cells;
   receiving, in the processor, a cell size associated with each activity;
   determining, by the processor, a quantity of workstations bound to each work activity associated with each activity in the first workstation allocation; and
   generating, by the processor, cell size violations for each cell based on the cell size associated with each activity associated with one of the plurality of cells and the quantity of workstations bound to each work activity for the cell, wherein cells with cell size violations are incomplete cells and cells without cell sized violations are complete cells;
   creating a global score for the first workstation allocation based on the generated cell size violation for each cell;
   identifying, with the processor, impermissible cell size violations based on weighted rules;
   correcting, by the processor, the cell size violation for at least one incomplete cell having an impermissible cell size violation, wherein the correction includes performing a local search to optimize the allocation for the determined cell to correct by:
     for each cell having a cell size less than the cell size for the cell to correct, deleting;
     unbinding the workstations bound to the activities associated with the work activities for the deleted cell;
     moving, by the processor, the respective unbound workstations from the deleted cell to the determined cell to correct and updating activities in the first workstation allocation between respective cells to minimize cell size violations;
     generating an impact on the global score based on the moving, and
     rebinding the data structures with the move of activities and workstations based on the move with a greatest impact on the global score;
   creating a second workstation allocation, wherein the second workstation allocation has a minimum number of cell size violations, further wherein the creation of the second workstation allocation shuffles the time interval for work activities and reassigns workstations to different work activities at different time intervals based on the correction and rebinding steps;
   displaying a final second workstation allocation on a user interface, wherein the final second workstation allocation is the second workstation allocation with minimized cell violations; and implementing the final second workstation allocation using the reassignment of workstations and shuffled work activities according to the final second workstation allocation.

2. The method of claim 1, further comprising the step of storing the second workstation allocation in the memory.

3. A method according to claim 1, further comprising creating an updated allocation schedule after each corrected incomplete cell.

4. A method according to claim 3, further comprising generating a global score for each updated allocation schedule.

5. A method according to claim 4, further comprising evaluating, with the processor, an increase or decrease in said global score to identify a convergence.

6. A computer system configured for creating optimized cell-based workstation allocation, comprising:
  a memory configured for storing a plurality of data structures, workstation allocations, and a plurality of cells; and
  a processor coupled to the memory, the processor determining a first workstation allocation from a set of the plurality of cells received from the memory, the set of the plurality of cells defining initial assignments of a plurality of workstations, a plurality of work activities, and a plurality of time periods, each shift time period comprising one or more work activity, each work activity comprising an activity to execute and a time interval, and storing the first workstation allocation in the memory, the processor further receiving a cell size associated with each activity and determining a quantity of workstations in each work activity associated with each activity in the first workstation allocation; and
  the processor generating cell size violations for each cell based on the cell size associated with each activity associated with one of the plurality of cells and the quantity of workstations bound to each work activity for the cell, wherein cells with cell size violations are incomplete cells and cells without cell size violations are complete cells, identifying impermissible cell size violations based on weighted rules,
  the processor correcting the cell size violation for at least one incomplete cell having an impermissible cell size violation, wherein the correction includes performing a local search to optimize the allocation for the determined at least one incomplete cell to correct by:
    for each cell having a cell size less than the cell size of the cell to correct, the processor deleting the cell;
    the processor unbinding the workstations bound to the activities associate with the work activities for the deleted cell;
    the processor moving the respective unbound workstations from the deleted cell to the determined cell to correct and updating activities in the first workstation allocation between respective cells to minimize cell size violations;
    the processor generating an impact on the global score based on the moving, and
    the processor rebinding the data structures with the move of activities and workstations based on the move with a greatest impact on the global score;
  the processor creating a second workstation allocation, wherein the second workstation allocation has a minimum number of cell size violations, further wherein the creation of the second workstation allocation shuffles the time interval for work activities and reassigns workstations to different work activities at different time intervals based on the correction and rebinding steps;
  the processor displaying a final second workstation allocation on a user interface, wherein the final second workstation allocation is the second workstation allocation with minimized cell violations; and
  the processor implementing the final second workstation allocation using the reassignment of workstations and shuffled work activities, according to the final second workstation allocation.

7. The computer system of claim 6, wherein the processor stores the second workstation allocation in the memory.

8. A computer system according to claim 6, further comprising assigning respective weights to said cell violations and converging on a revised allocation schedule with a selection of said cell violations allowed in said revised workstation allocation depending on said weight.

9. A computer system configured for processing optimized workstation allocation, comprising:
  a memory configured for storing a plurality of workstation allocations, a plurality of data structures associated with a plurality of cells to which a plurality of workstations and a plurality of activities are, separately re-assignable by being bound and unbound to another data structure independently of the workstation allocation;
  a processor coupled to the memory, the processor receiving a set of the plurality of cells from the memory, the processor determining a first workstation allocation from the received plurality of cells, the set of the plurality of cells defining initial assignments of a plurality of workstations to a plurality of time periods, each time period comprising one or more work activities, each work activity comprising an activity to execute and a time interval, said processor storing the first workstation allocation in the memory, the processor coupling each workstation and a respective activity to a respective data structure, the processor further receiving a cell size associated with each work activity and determining a quantity of work stations bound to each work activity in the first workstation allocation;
  wherein the processor generates cell size violations for each cell based on the cell size associated with each activity associated with one of the plurality of cells and the quantity of workstations bound to each work activity for the cell;
  wherein the cells are either complete cells in which work activity variables match workstation variables assigned to the cells, wherein complete cells do not have a cell size violation, or incomplete hole cells having mismatches between the work activity variables and the workstation variables assigned to the cells, wherein incomplete hole cells have a cell size violation;
  wherein the processor creates a global score for the first workstation allocation based on the complete and incomplete cells;
  wherein the processor corrects at least one incomplete hole cell, wherein the correction includes performing a local search to optimize the allocation for the at least one incomplete hole cell to correct by:
    deleting at least one complete cell having a cell size less than the respective hole cell to correct;
    unbinding the workstations bound to work activities associated with the deleted cell and storing the unbound workstations in a local search queue;

utilizing the local search queue of said first workstation allocation and during each local search, the processor builds and stores in memory new cells from the plurality of cells by swapping, among the plurality of cells, at least said work activity variables from said deleted cell;

generating an impact on the global score based on the swapping; and wherein for each search, the processor binds and unbinds the swapped workstations and work activities to respective data structures based on the swap with a greatest impact on the global score;

wherein the system converges on a second workstation allocation with a minimum number of cell violations;

wherein the processor creates the second workstation allocation based on the convergence, wherein the creation of the second workstation allocation shuffles the time interval for the work activities and reassigns workstations to different work activities at different time intervals based on the swapping and rebinding instructions;

displaying a final second workstation allocation on a user interface, wherein the final second workstation allocation is the second workstation allocation with minimized cell violations; and wherein the processor implements the final second workstation allocation using the reassignment of workstations and shuffled work activities according to final second workstation allocation.

10. A computer system according to claim 9, wherein the processor conducts said local searches on an iterative basis to converge.

11. A computer system according to claim 9, wherein during each local search, said processor iteratively binds and unbinds a workstation from its respective data structure and activity from its respective data structure to a respective cell prior to converging on a revised workstation allocation.

12. A computer system according to claim 9, further comprising assigning respective weights to said cell violations and converging on a revised workstation allocation with a selection of said cell violations allowed in said revised workstation allocation depending on said weight.

* * * * *